July 12, 1932. D. F. McDONALD 1,866,898
COMBINATION CONVERTIBLE PASSENGER AUTOMOBILE BODY
Filed Sept. 3, 1929 2 Sheets-Sheet 1

INVENTOR.
Dale F. McDonald.
BY
Townsend, Loftus & Abbett
ATTORNEYS.

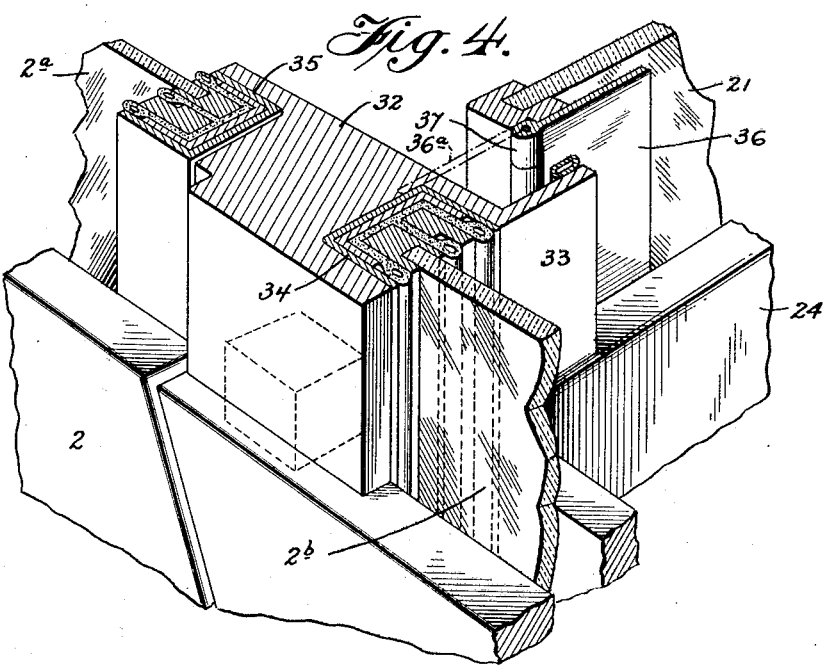
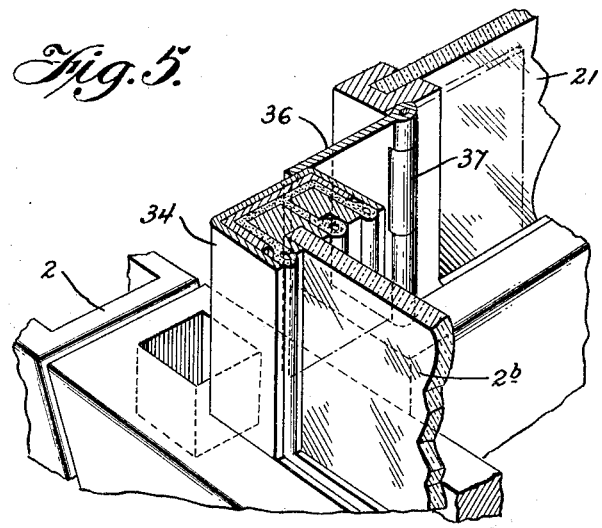

Patented July 12, 1932

1,866,898

UNITED STATES PATENT OFFICE

DALE F. McDONALD, OF EVANSTON, ILLINOIS

COMBINATION CONVERTIBLE PASSENGER AUTOMOBILE BODY

Application filed September 3, 1929. Serial No. 390,063.

This invention relates to a combination convertible passenger automobile body, especially to an automobile body which is convertible through means of glass shields and windows the construction and combined arrangement of which are not common to the automobile industry; and further to the construction of intermediate windshield and window posts so as to form weather-tight connection between these members.

The object of the present invention is to generally improve and simplify the construction and operation of convertible automobile bodies of the character described; to provide a pair of long rear side windows and an intermediate division windshield to completely enclose the front and sides of the rear seat with glass, when the car is used with or without a top; to provide continuous glass from the front windshield to the rear of the rear seat in such a manner as to permit practically clear vision and at the same time afford protection from wind or rain from either or both sides; to provide an intermediate windshield of longer length than usual extending practically to the sides of the car, with narrow metal flaps at the ends so that the gap between the windshield and the window may be closed and so as to afford protection to the rear seat occupants without materially obstructing clear vision at the sides; to provide a front windshield which is adapted to be tilted rearwardly as well as forwardly and which, when in an upright position, will form a tight connection with the windows arranged along the sides of the motor car; and further to provide a pair of removable posts which are adapted to align with the intermediate windshield, which support the automobile top when the rear half of the car is covered, and which may be used when the top is up and extended full length.

Figure 1:
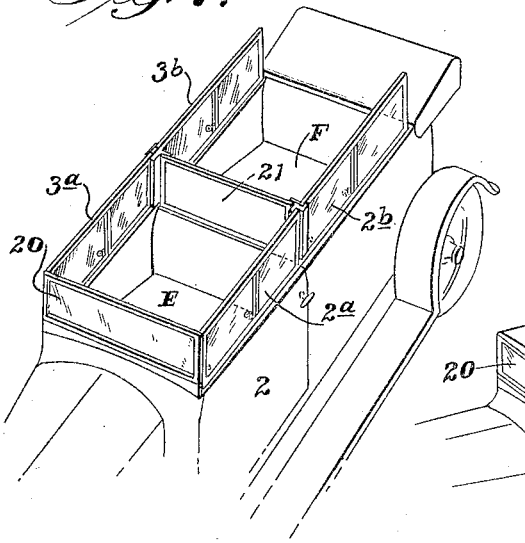
Figure 2:
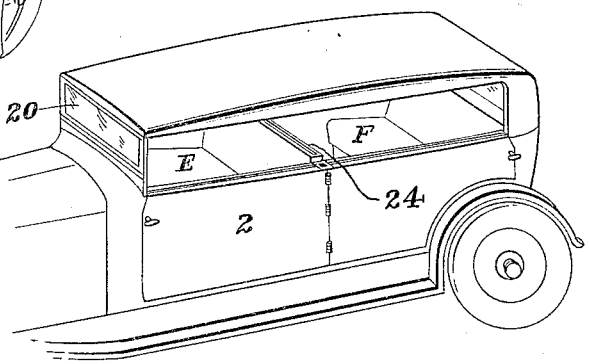
Figure 3:
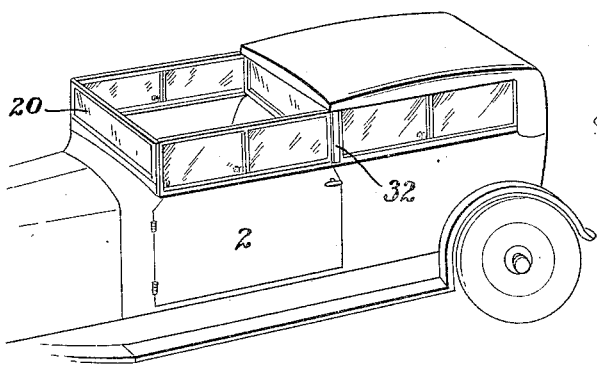

The convertible automobile body is shown by way of illustration in the accompanying drawings, in which:

Figure 1 is a perspective view of an automobile showing all the side windows and the windshields in raised position, Figure 2 is a similar view showing the automobile top fully extended and with the side windows and intermediate windshield in lowered position, Figure 3 is a similar view showing the automobile top covering the rear half of the car only, and with all windows and the windshields raised, Figure 4 is an enlarged detailed view of one of the removable posts and the position of the different windows and windshield with relation thereto.

Figure 5 is a detailed view of the portion shown in Figure 5 with the post 32 removed and showing the metal flap in an open position.

The type of motor car illustrated in the present instance is a four passenger, two door car with two seats, a front seat generally indicated at E, and a rear seat generally indicated at F. The two doors employed are front doors, as indicated at 2 and 3. These doors are provided with pockets and each pocket contains a window which is adapted to be extended or lowered into the pocket by any conventional window operating mechanism.

There is a window 2a mounted in the door 2 and a window 3a mounted in the door 3. These are the only two doors employed in the present instance hence the remaining windows will be mounted in pockets formed in the body proper. These windows are illustrated at 2b and 3b.

As the invention is applicable to four door cars as well as two door cars, a four door car is shown in Figure 3. It is to be understood that in the car shown in Figure 3 the windows 2b and 3b of Figure 2 would be mounted in the pockets formed in the two rear doors instead of in the body proper.

Two windshields are also employed, a standard form of front windshield such as shown at 20 and an intermediate windshield such as shown at 21. The front windshield is pivoted so it may be tilted rearwardly to 45 degrees as well as forwardly to 90 degrees, as the occupants may desire. When in an upright position, as shown in Figure 1, a joint is made with relation to the windows 2a and 3a, this joint being clearly indicated at 22. That is, the frame of the windshield 20 is provided with shoulders such as shown at 22 which the frames of the windows 2a and 3a engage, thus forming a substantially weather-tight joint to prevent entrance of wind or rain.

The intermediate windshield shown at 21 is contained in a pocket or housing, such as shown at 24 which is mounted on the rear side of the backrest of the front seat E. The windshield is raised and lowered as previously stated by conventional mechanism to shield the occupants of the rear seat when desired.

The pocket 24 is slightly deeper than the remaining pockets, thus providing for an intermediate windshield which can be raised when desired to a greater height than the adjacent windows. This is an advantage when the top is employed, as shown in Figure 2 as it permits the intermediate windshield to be raised into engagement with the top, thereby forming a complete partition between the front and rear seats.

The several side windows and windshields employed permit a motor car to be converted so as to give different appearances and usages, for instance it may be converted to give the appearance and style of an open sport car, an open sided touring car, a sedan, a limousine and a town car, this latter being particularly true when a top such as illustratrated in my co-pending application entitled "Convertible automobile top" filed August 1, 1928, Serial Number 296,643 is employed in conjunction therewith. When the intermediate windshield is raised into engagement with the top thus separating front and rear seat compartments the limousine type of car is obtained. Except for the additional height to which the intermediate windshield may be raised, the windows and intermediate windshield are all of the same height as the front windshield. When the top is down protected and comfortable riding is permitted with practically full outward light and view. It enables the occupants of either or both seats to shield themselves with forward windshields, and the occupants of either or both seats to protect themselves on either or both sides by raising the windows.

In Figure 1 the front windshield is upright, the intermediate windshield extended to its normal height, and the side windows 2a, 2b, 3a and 3b to their full height. Occupants of either or both seats will thus be protected from the front and sides. Ventilation for occupants of either or both seats may be obtained by lowering partially or fully any one or all of the side windows. The intermediate windshield may likewise be lowered for occupants of the rear seat and the front windshield tilted for occupants of the front seat.

If the top is fully extended as shown in Figure 2, it is again possible to raise the intermediate windshield and side windows as desired and this is also true when the top is half way extended, as shown in Figure 3. When the top is half way extended it is essential to employ posts, such as indicated at 32 in Figure 4. These posts support the front edge of the top and they also form guides for the intermediate windshield and for the front and rear side windows indicated at 2a, 2b and 3a and 3b. For instance, the intermediate windshield is guided by a channel member 33 forming part of the post. The window 2b is guided by a channel member 34 carried by the post, and the window 2a by an angle channel such as shown at 35, the angle channel being essential to permit opening and closing of the front door when the windows 2a and 3a are raised.

When the top is not used, as shown in Figure 1, the posts are not essential and in order to provide a weather-tight joint between the intermediate windshield 21 and the rear side windows 2b and 3b a pair of metal flanges are employed, as indicated at 36. These are hingedly secured to the windshield frame, as indicated at 37. They assume the position shown in Figure 4 when the post 32 is employed but they are swung outwardly as indicated by dotted lines at 36a when the post is not employed, and thus form a flap or filler between the side windows 2b and 3b and the intermediate windshield preventing entrance of wind or rain.

While certain features of the present invention are more or less specifically described, I wish it understood that various changes may be resorted to within the scope of the appended claims, and similarly, that the materials and finishes of the several parts employed may be such as the manufacturer may decide or varying conditions or uses may demand.

Having thus described my invention, what I claim and desire to secure by Letters Patent is:

1. In combination with a vehicle body having front and rear side windows and an intermediate windshield, a removable post carried by the body, means carried by the post to slidably receive said windows and windshield, and a flap carried by said intermediate windshield and adapted to form a weather-tight joint between said windshield and the rear side window when the post is removed.

2. In combination with a vehicle body having front and rear side windows and an intermediate windshield, a removable post carried by the body, means on said post to slidably receive said windows and windshield, and hinged flaps adapted to be positioned between the rear side windows and windshield to form a closure therebetween when the post is removed.

DALE F. McDONALD.